(12) United States Patent
Johansson et al.

(10) Patent No.: US 9,037,179 B2
(45) Date of Patent: May 19, 2015

(54) METHOD AND NETWORK NODE IN A WIRELESS COMMUNICATION SYSTEM

(75) Inventors: Richard Johansson, Enskede (SE); Anders Christensson, Älvsjö (SE); Benny Lennartson, Hägersten (SE); Joakim Riedel, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 590 days.

(21) Appl. No.: 13/392,624

(22) PCT Filed: Jan. 10, 2012

(86) PCT No.: PCT/SE2012/050007
§ 371 (c)(1),
(2), (4) Date: Feb. 27, 2012

(87) PCT Pub. No.: WO2012/173549
PCT Pub. Date: Dec. 20, 2012

(65) Prior Publication Data
US 2012/0322488 A1    Dec. 20, 2012

Related U.S. Application Data

(60) Provisional application No. 61/498,130, filed on Jun. 17, 2011.

(51) Int. Cl.
*H04B 7/00* (2006.01)
*H04W 16/10* (2009.01)
*H04W 72/06* (2009.01)
*H04W 72/08* (2009.01)

(52) U.S. Cl.
CPC ............. *H04W 16/10* (2013.01); *H04W 72/06* (2013.01); *H04W 72/082* (2013.01)

(58) Field of Classification Search
CPC .................................................... H04W 16/10
USPC .......... 455/513, 515, 511, 509, 524; 370/310, 370/315, 328, 329, 330
See application file for complete search history.

(56) References Cited

U.S. PATENT DOCUMENTS

| | | | |
|---|---|---|---|
| 6,038,455 | A | 3/2000 | Gardner et al. |
| 2002/0085622 | A1 | 7/2002 | Dhar et al. |
| 2006/0262750 | A1* | 11/2006 | Walton et al. ................. 370/329 |

(Continued)

FOREIGN PATENT DOCUMENTS

| | | |
|---|---|---|
| EP | 2083594 A2 | 7/2009 |
| WO | 02091597 A2 | 11/2002 |

(Continued)

OTHER PUBLICATIONS

Xiao, Han et al. "A Novel Fractional Frequency Reuse Architecture and Interference Coordination Scheme for Multi-cell OFDMA Networks," 2010 IEEE Vehicular Technology Conference, May 19, 2010, pp. 1-5, Taipei, Taiwan.

*Primary Examiner* — Sanh Phu
(74) *Attorney, Agent, or Firm* — Murphy, Bilak & Homiller, PLLC

(57) ABSTRACT

Network node (120) and method in the network node (120) for allocating a radio resource in a first radio coverage area (115-1) when establishing a wireless communication with a mobile station (130-1), which radio resource is not assigned exclusively for the first radio coverage area (115-1) but may be shared between multiple radio coverage areas within a local radio environment.

28 Claims, 9 Drawing Sheets

(56) References Cited

U.S. PATENT DOCUMENTS

2008/0171551 A1 7/2008 Zhu et al.
2008/0248803 A1 10/2008 Lee et al.
2010/0248730 A1 9/2010 Han et al.
2011/0103365 A1 5/2011 Sankaran et al.

FOREIGN PATENT DOCUMENTS

| WO | 2008081309 A2 | 7/2008 |
| WO | 2009052754 A1 | 4/2009 |
| WO | 2010076773 A2 | 7/2010 |
| WO | 2010111006 A1 | 9/2010 |

* cited by examiner

METHOD AND NETWORK NODE IN A WIRELESS COMMUNICATION SYSTEM

TECHNICAL FIELD

Implementations described herein relate generally to a network node and a method in a network node. In particular is herein described a mechanism for radio resource sharing within a local radio environment.

BACKGROUND

Mobile Stations (MS), also known as User Equipment (UE), wireless terminals and/or mobile terminals are enabled to communicate wirelessly in a wireless communication system, sometimes also referred to as a cellular radio system. The communication may be made e.g. between two mobile stations, between a mobile station and a regular telephone and/or between a mobile station and a server via a Radio Access Network (RAN) and possibly one or more core networks.

The mobile stations may further be referred to as mobile telephones, cellular telephones, laptops with wireless capability. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The wireless communication system covers a geographical area which is divided into Radio Coverage Areas (RCA), e.g. radio cells. Each radio coverage area is served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A radio coverage area is the geographical area where radio coverage is provided by the network node/base station at a base station site. One base station, situated on the base station site, may serve one or several radio coverage areas. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, which may be referred to as eNodeBs or even eNBs, may be connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of GSM, UMTS, LTE and LTE-Advanced. LTE is a technology for realizing high-speed packet-based communication that may reach high data rates both in the downlink and in the uplink, and is thought of as a next generation mobile communication system relative UMTS.

In the present context, the expressions downlink, downstream link or forward link may be used for the transmission path from the network node to the mobile station. The expression uplink, upstream link or reverse link may be used for the transmission path in the opposite direction i.e. from the mobile station to the network node.

GSM technology according to prior art, provides a synchronized and frame aligned Local Radio Environment (LRE) with unique Radio Resource (RR) assignment per mobile call within the local radio environment at any time, resulting in collision free radio resource utilization within the local radio environment with respect to combination of frequency and frame time slot number and in best case random collision behaviour towards radio resource utilization outside the local radio environment. To maintain this orthogonal radio resource utilization is comprised definitions as of the local radio environment area in terms of a number of radio coverage areas, constituting a cluster. Also comprised is synchronization and frame alignment within the local radio environment area. In addition is comprised allowing frequency hopping when using the same frequency hopping sequence for indexing and the same frequency table for all mobile calls within the local radio environment area. Furthermore, assigning unique radio resource per mobile call within the local radio environment area in terms of unique combination of frequency and frame time slot number where frequency is selected either explicitly or by use of an offset value against a frequency hopping sequence index, may be comprised.

FIG. 1 below shows an example of such an local radio environment covering three radio coverage areas, (RCA A, RCA B and RCA C) with unique radio resource assignment (RR 1 to RR 7) within the local radio environment, according to prior art. The method to assign a unique radio resource within the local radio environment may use either fixed frequencies or offset against a frequency hopping sequence index, so called Mobile Allocation Index Offset (MAIO) and assignment may be made firmly per radio coverage area, i.e. each frequency or offset value assigned to only one radio coverage area, or on call basis, i.e. each frequency or offset value may be used in several radio cells simultaneously but uniquely per frame time slot number. The technical prerequisite for a local radio environment is merely that each combination of frequency and frame time slot number is uniquely assigned to one mobile call within the local radio environment at a given time. An advantage with forming such local radio environment, i.e. clusters of radio coverage areas, is that the interference between radio coverage areas within the cluster may be controlled and thereby reduced by distributing the radio resources within the cluster appropriately.

Prior art GSM technology also provides means, which may be software controlled or manual, to form the local radio environments. Such clusters of radio coverage areas may be formed from a network wide pattern of radio coverage areas by merging radio coverage areas that have high expected signal interference, e.g. by analysing signal strength relations, or physical antenna orientation, and thus benefit from orthogonal radio resource planning, or by other somewhat similar manners. Different stop criteria for forming larger local radio environments may apply, from which one obvious is running out of unique radio resources within the local radio environment, given a capacity requirement per radio coverage area.

Prior art GSM technology, as described above, suffers from some limitations, such as e.g. local radio environment size limitation. Possibility to form a local radio environment covering a larger number of radio coverage areas is limited by the expected number of unique radio resources estimated per radio coverage area, i.e. the number of instant frequencies used per radio coverage area, implemented as number of transmitters intended for traffic channels. It limits the creation of larger areas benefiting from the controlled interference environment that comes with all traffic channels being synchronized and aligned.

Another limitation of the prior art GSM technology is call capacity limitation. The total theoretical call capacity within a local radio environment is limited by the number of unique radio resources that may be defined, given the number of frequencies and the number of frame time slots. Also, for systems using a policy of firmly assigned frequency domain resources per radio coverage area, the individual theoretical call capacity per radio coverage area is limited by the number of unique radio resource assigned to that radio coverage area, thus a rigid capacity distribution is obtained.

SUMMARY

It is therefore an object to obviate at least some of the above mentioned disadvantages and to improve the performance in a wireless communication system.

According to a first aspect, the object is achieved by a method in a network node. The method aims at allocating a shared radio resource to be used by a first radio unit, serving a first radio coverage area when establishing a wireless communication with a mobile station. The mobile station is situated within the first radio coverage area in a local radio environment. The local radio environment comprises a plurality of radio units, each serving a respective radio coverage area. The method comprises two procedures, a planning procedure and an allocation procedure. The planning procedure is configured for ranking other radio units comprised in the local radio environment in order of preference for sharing the radio resource with the first radio unit when establishing the wireless communication with the mobile station. The planning procedure is performed as a preliminary allocation decision support, independently of the location of the mobile station and of the radio resource to be shared. The allocation procedure is configured for allocating the shared radio resource to the first radio unit when establishing the wireless communication with the mobile station. The radio resource is shared with another radio unit within the local radio environment, based on the ranking of radio units. The allocation procedure is performed when the mobile station has been detected within the first radio coverage area.

According to a second aspect, the object is achieved by a network node. The network node is configured for allocating a shared radio resource to be used by a first radio unit, serving a first radio coverage area when establishing a wireless communication with a mobile station. The mobile station is situated within the first radio coverage area in a local radio environment. The local radio environment comprises a plurality of radio units. Each of the radio units is serving a respective radio coverage area. The network node comprises a processing circuitry. The processing circuitry is configured to perform a planning procedure for ranking other radio units comprised in the local radio environment, in order of preference for sharing the radio resource with the first radio unit when establishing the wireless communication with the mobile station. The planning procedure is performed as a preliminary allocation decision support, independently of the location of the mobile station and of the radio resource to be shared. The processing circuitry is also configured to perform an allocation procedure for allocating the shared radio resource to the first radio unit when establishing the wireless communication with the mobile station. The radio resource is shared with another radio unit comprised within the local radio environment based on the ranking of radio units and wherein the allocation procedure is performed when the mobile station has been detected within the first radio coverage area.

Some advantages according to some embodiments comprise possibility to increase service quality on existing spectrum by expansion of local radio environments. A further possible advantage may be the possibility to maintain service quality while reducing spectrum during spectrum refarming. Also, embodiments of the method disclosed herein enable the configuration of larger local radio environments than possible according to prior art solutions. The theoretical call capacity may further be increased, whereby the capacity of the wireless communication system is increased. Thus an improved performance within a wireless communication network is provided.

Other objects, advantages and novel features of the method and network node will become apparent from the following detailed description.

BRIEF DESCRIPTION OF THE DRAWINGS

The method and network node are described in more detail with reference to attached drawings illustrating examples of embodiments in which.

DETAILED DESCRIPTION

Embodiments herein are defined as a network node and a method in the network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
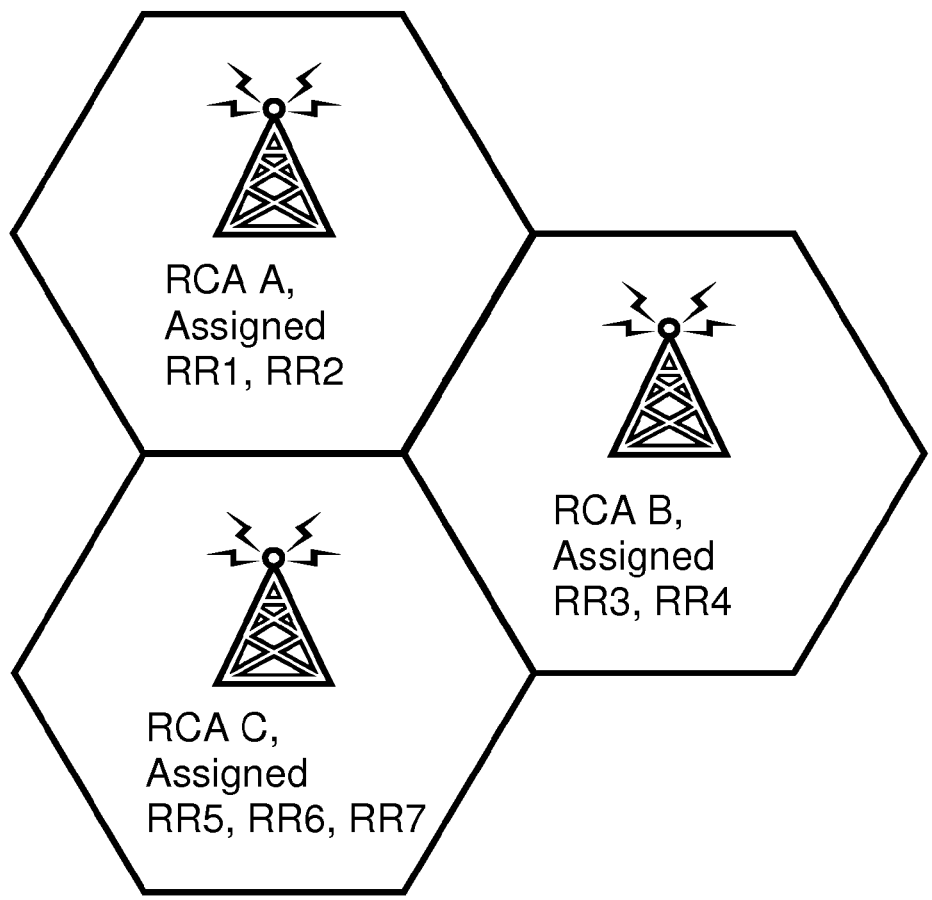
FIG. 1 is a schematic block diagram illustrating a wireless communication system according to prior art.
Figure 2:
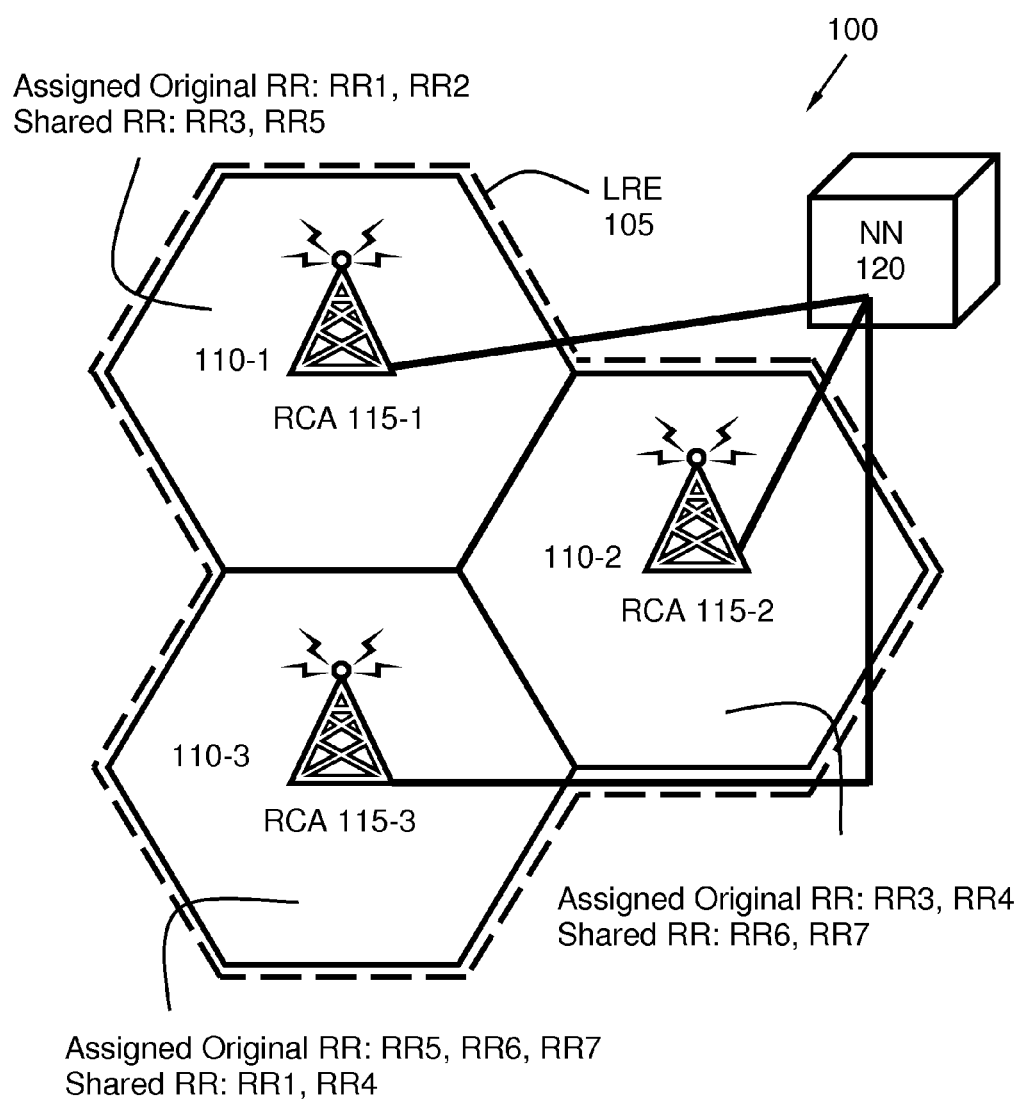
FIG. 2 is a schematic block diagram illustrating embodiments of a wireless communication system and a method therein.

FIG. 2 is a schematic illustration over a wireless communication system 100. The figure shows a Local Radio Environment (LRE) 105 covering three radio coverage areas (RCAs) 115-1, 115-2, 115-3, with original Radio Resource (RR) assignment (RR1 to RR7) and sharing radio resource assignment (RR1 and RR3 to RR7) within the local radio environment 105. Each of the radio coverage areas 115-1, 115-2, 115-3 is served by a base station 110-1, 110-2 and 110-3, respectively. However, it may be noted that the illustrated example is merely a non-limiting example of a configuration; the local radio environment 105 may be formed by any other number of radio coverage areas 115-1, 115-2, 115-3. Also, each of the base stations 110-1, 110-2 and 110-3 may serve more than one radio coverage area 115-1, 115-2, 115-3, such as e.g. three radio coverage areas 115-1, 115-2, 115-3, according to some embodiments.

The wireless communication network 100 also comprises a network node 120, which is a control node. The network node 120 may be e.g. may be referred to as a Base Station Controller (BSC) or a Radio Network Controller (RNC). The network node 120 is a governing element in the wireless communication network 100, which may be responsible for control of any, some or all of the base stations 110-1, 110-2, 110-3 within the local radio environment 105.

The network node 120 may carry out radio resource management, some of the mobility management functions and may be the point where resource allocation is made. It is to be noted that the controlling network node 120 may be controlling any number of base stations 110-1, 110-2, 110-3. The interface connection between each governed base station 110-1, 110-2, 110-3 and the controlling network node 120 may be wired or wireless according to different embodiments.

It is to be noted that the embodiment illustrated in FIG. 2 is only a non-limiting example of a possible environment wherein the present method may be implemented.

The wireless communication system 100 may comprise a GSM system, according to some embodiments. However, the wireless communication system 100 may alternatively, or at least partly, be based on other radio access technologies such as e.g. 3rd Generation Partnership Project (3GPP) Long Term Evolution (LTE), LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few exemplary options.

Further, the wireless communication system 100 may comprise a pseudo random frequency hopping network, according to some embodiments.

The base station 110-1, 110-2, 110-3 may according to some embodiments be referred to as e.g. Radio Base Station (RBS), NodeB, evolved Node B (eNB, or eNode B), base transceiver station, Access Point Base Station, base station router, macro base station, micro base station, pico base station, femto base station, Home eNodeB, sensor, beacon device, or any other network node configured for communication over a wireless interface, depending e.g. of the radio access technology and terminology used.

In the example illustrated in FIG. 2, the first radio coverage area 115-1 may originally have been assigned radio resources, such as transmission frequencies, RR1 and RR2, the second radio coverage area 115-2 may originally have been assigned RR3 and RR4 while the third radio coverage area 115-3 may originally have been assigned RR5, RR6 and RR7.

A general concept according to embodiments of the disclosed method is to share, or re-use, radio resources, which have originally been allocated to another radio coverage area 115-1, 115-2, 115-3 within the local radio environment 105. In FIG. 2, the first radio coverage area 115-1 is sharing RR3 with RCA 115-2 and RR5 with RCA 115-3, the second radio coverage area 115-2 is sharing RR6 and RR7 with RCS 115-3 while the third radio coverage area 115-3 is sharing RR1 with RCS 115-1 and RR4 with RCA 115-2.

It is however to be noted that the terms of "sharing" or "re-using" radio resources, in the present context are to be interpreted without implications that one part is the owner and the other is reusing the radio resource, but rather that the radio resource is common to be shared on equal terms.

The assignment of radio resources to be shared for each radio coverage area 115-1, 115-2, 115-3, which may be made in the network node 120, may be implemented in different ways, as will be further explained in detail subsequently.

Thus, a concept according to some embodiments of the method described herein, is to share radio resources within the local radio environment 105, but without conflicting with the original radio resource assignment in another radio coverage area 115-1, 115-2, 115-3, independent of whether a radio resource is assigned with fixed frequency or offset against a frequency hopping sequence index and independent of whether frequencies are assigned firmly per radio coverage area 115-1, 115-2, 115-3, or on mobile call basis over multiple radio coverage areas 115-1, 115-2, 115-3. If frequencies are not assigned to specific radio coverage areas 115-1, 115-2, 115-3, but assigned per mobile call, still a combination of frequency and frame time slot number (the unique radio resource) may be possible to share within the local radio environment 105 without conflicting with the original radio resource assignment, e.g. radio resource sharing outside the original radio resource assignment radio coverage areas 115-1, 115-2, 115-3. Both original radio resources and shared radio resources may be synchronised and frame aligned under the conditions of the local radio environment 105.

Embodiments of the method described herein may comprise breaking the orthogonal radio resource assignment, which may be performed in a controlled way and thus injected extra interference (synchronised and frame aligned) may be manageable. For this purpose two functions may be utilised: the internal radio resource sharing planning of the local radio environment 105 comprising possible pre-assignment of radio resources to radio coverage areas and the mobile call based radio resource allocation with the local radio environment 105 internal radio resource sharing option comprised, which subsequently will be further explained more in detail.

Both functions may be responsive to changes in the definition of the local radio environment 105, as well as other relevant configurations, either in a manual or an automated manner according to different embodiments.

Figure 3:
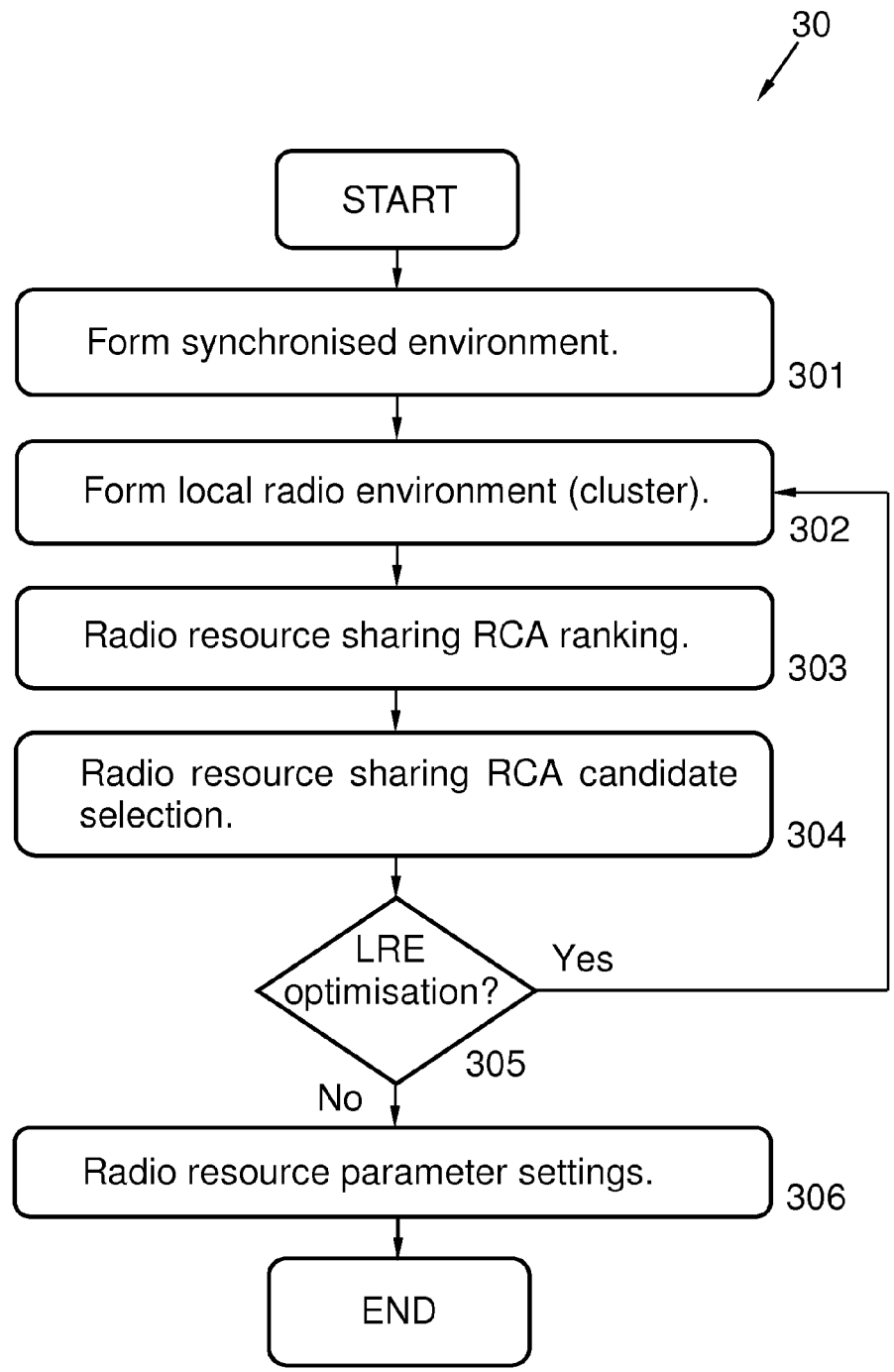
FIG. 3 is a schematic flow chart illustrating actions comprised in a method according to some embodiments.

FIG. 3 shows the general process flow 30 for internal radio resource sharing planning of the local radio environment 105. The internal radio resource sharing planning of the local radio environment 105 may determine best possible frequency sharing, or at least a somewhat improved frequency sharing within the local radio environment 105 with respect to interference injection, taking into account relations between different radio coverage areas 115-1, 115-2, 115-3 within the local radio environment 105 as well as frequency domain resources configured for the local radio environment 105 comprising physical equipment such as e.g. transceivers (TRX). The LRE internal radio resource sharing planning 30 may be performed in the network node 120. In general, this function may consider radio coverage area to radio coverage area relations meaning that given a requirement for a radio resource sharing in a radio coverage area 115-1, 115-2, 115-3; the best suitable, or at least somewhat appropriate surrounding radio coverage areas 115-1, 115-2, 115-3 (i.e. radio coverage areas 115-1, 115-2, 115-3 within the local radio environment 105 holding original radio resources to be shared) may be listed e.g. in a ranked manner and a candidate set selection may be made to match the frequency domain resources configured for the local radio environment 105. In the case frequencies are assigned firmly per radio coverage area 115-1, 115-2, 115-3, this function may also provide in advance selection of internal frequency sharing within the local radio environment 105, based on the radio coverage area candidate set selected above. This function may be relatively slow, tuning on measured network changes and not a part of the runtime radio resource allocation flow more than as it provides frequency sharing baseline configurations.

To appropriately perform the internal radio resource sharing planning in the local radio environment 105, the method 30 may comprise a number of actions 301-306.

It is however to be noted that some of the described actions, e.g. action 301-306 may be performed in a somewhat different chronological order than the enumeration indicates. Also, it is to be noted that some of the actions such as e.g. 301-302 may be performed within some alternative embodiments. Further any, some or all actions 301-306, such as for example e.g. 301, 302 and/or 303 may be performed simultaneously or in a rearranged chronological order. The method 30 for internal radio resource sharing planning within the local radio environment 105 may comprise the following actions:

Action 301

This alternative action may be comprised within some embodiments of the method 30 for internal radio resource sharing planning.

A synchronised environment within the wireless communication network 100 may be formed. Thereby may the radio resources assigned to different radio coverage areas 115-1, 115-2, 115-3 be synchronised and/or frame aligned.

Action 302

This alternative action may be comprised within some embodiments of the method 30 for internal radio resource sharing planning of the local radio environment 105.

A local radio environment 105 comprising a cluster of radio coverage areas 115-1, 115-2, 115-3 may be formed.

The actions 301 and 302 comprise sub-functions for the initial forming of a synchronised area and initial forming of the local radio environment 105 which may be performed according to some embodiments.

Action 303

Radio resource sharing radio coverage area ranking. This action may provide, for each radio coverage area 115-1, 115-2, 115-3 within the local radio environment 105, a ranked list of surrounding radio coverage area 115-1, 115-2, 115-3 within the local radio environment 105 with the meaning of highest ranked as the choice of the best radio coverage area 115-1, 115-2, 115-3 to share originally assigned radio resources from with the least estimated additional interference injected. This action 303 may use different criteria for ranking such as measured radio coverage area to radio coverage area signal quality relations or physical radio coverage area to radio coverage area relations comprising, but not limited to, radio coverage area locations and antenna directions. The radio coverage area to radio coverage area relations may thus be quantified and a qualification threshold may be defined to limit which radio coverage areas may be candidates for radio resource sharing.

Action 304

Radio resource sharing radio coverage area candidate selection. This action may provide, for each radio coverage area 115-1, 115-2, 115-3 within the local radio environment 105, a ranked list of selected radio coverage area candidates from surrounding radio coverage areas 115-1, 115-2, 115-3 within the local radio environment 105 with a selection up to full utilisation of available frequency domain resources and maintained relative ranking from action 303 above. The method of selection may be different depending on purpose according to:

Embodiment a)

A static division of frequency domain resource usage between original radio resource assignment and radio resource sharing assignment, in which the frequency domain resources are dedicated for original radio resource assignment respectively radio resource sharing assignment and this sub-function only may populate the frequency domain resources dedicated for radio resource sharing assignment in terms of reference to selected original radio coverage area 115-1, 115-2, 115-3.

Embodiment b)

A flexible division of frequency domain resource usage between original radio resource assignment and radio resource sharing assignment, in which all frequency domain resources are considered as a resource pool and this sub-function may in an optimal way select enough frequency domain resources for radio resource sharing assignment to fit in the original radio resource assignment into available frequency spectrum within the local radio environment 105 and provide reference to selected original radio coverage area per frequency domain resources intended for radio resource sharing assignment. This sub-function may then consider not only the radio coverage area ranking per radio coverage area but also look to the quantified value of interference potential in order to determine which radio coverage area 115-1, 115-2, 115-3 may get the next radio resource sharing radio coverage area candidate selection. A rule of thumbs may apply that at least half of the available frequency domain resources per radio coverage area 115-1, 115-2, 115-3 may remain for original radio resource assignment according to some embodiments.

Embodiment c)

A reduction version of embodiment a) or embodiment b) above where the amount of desired frequency domain resources already matches the available frequency spectrum and the purpose may be to further reduce the desire for frequency spectrum (by re-assigning frequency domain resource usage from original radio resource assignment to radio resource sharing assignment) and thus enable further merging of local radio environment 105 into larger areas with controlled synchronised and frame aligned behaviour. This embodiment is illustrated as the iterative mode choice, or LRE optimisation choice according to action 305 in FIG. 3.

Action 306

Radio resource sharing parameter settings. This sub-function may set the desired frequency domain related network configuration parameters. Due to the iterative mode, this may be done at the end comprising also the original radio resource assignment purpose parts, according to some embodiments. In case frequencies are assigned firmly per radio coverage area 115-1, 115-2, 115-3, either fixed frequencies or offsets against a frequency hopping sequence index may be assigned per radio coverage area 115-1, 115-2, 115-3, both for original radio resource assignment purposed and for radio resource sharing assignment purposes. If frequencies are assigned in runtime per mobile call, a radio coverage area sharing list (ranked and selected as of action 303 and action 304 above per radio coverage area 115-1, 115-2, 115-3 may be maintained as the frequency sharing baseline configuration.

The data compilation for the flexible division of frequency domain resource usage case, may be the more complicated one. According to some embodiments, sharing of frequency domain resources with physical entity resolution on transmitter level, it implies the firm assignment of frequency domain resources case, while in the case of runtime per mobile call assignment only the preferences of the ranking table may be used to find the best suitable radio resource in best suitable neighbouring radio coverage area 115-1, 115-2, 115-3 within the local radio environment 105 to share, e.g. in case there is no vacant radio resource within the complete pool of radio resources, according to some embodiments. Alternatively, an acceptable radio resource may be selected from a neighbouring radio coverage area 115-1, 115-2, 115-3 which may be considered as acceptable.

The quantified radio coverage area to radio coverage area relations, or RCA-to-RCA relations, may be implemented as direction sensitive in which case the highest interference quantity of each pair is marked out and used to create the ranked list per radio coverage area 115-1, 115-2, 115-3. For the flexible division case, all frequency domain resources are marked as original TRX pool initially. For the static division case the separation between original TRX and shared TRX may already have been done in advance, according to some embodiments.

The radio resource sharing qualification threshold may rule out too strong interferers for radio resource shared assignment as well as due to the fact that some choices in the flexible division case are by nature equal such choices may be altered, in some embodiments.

When performing the radio resource sharing cell candidate selection, frequency domain resource demands are moved from being original TRX to being shared TRX after marking the amount of radio resource sharing assignment towards each listed surrounding radio coverage areas 115-1, 115-2, 115-3 within the local radio environment 105. The total number of original TRX per local radio environment 105 may then be reduced to match the frequency spectrum available, while the overall total frequency domain resources (original TRX plus shared TRX) may match the physical resources available which in turn may match the required call capacity in the local radio environment 105. According to some embodiments, the most restrictive version may comprise where one frequency domain resource is only allowed to be shared in one extra radio coverage area 115-1, 115-2, 115-3 which of course limits the possibility to reduce the number of original TRX still selecting radio coverage areas 115-1, 115-2, 115-3 with low interference value. On the other hand it protects against too much injected synchronised and aligned interference and with only one extra radio resource sharing assignment radio coverage area 115-1, 115-2, 115-3 the nature of one dominant interferer may be achieved which is desirable.

Figure 4:
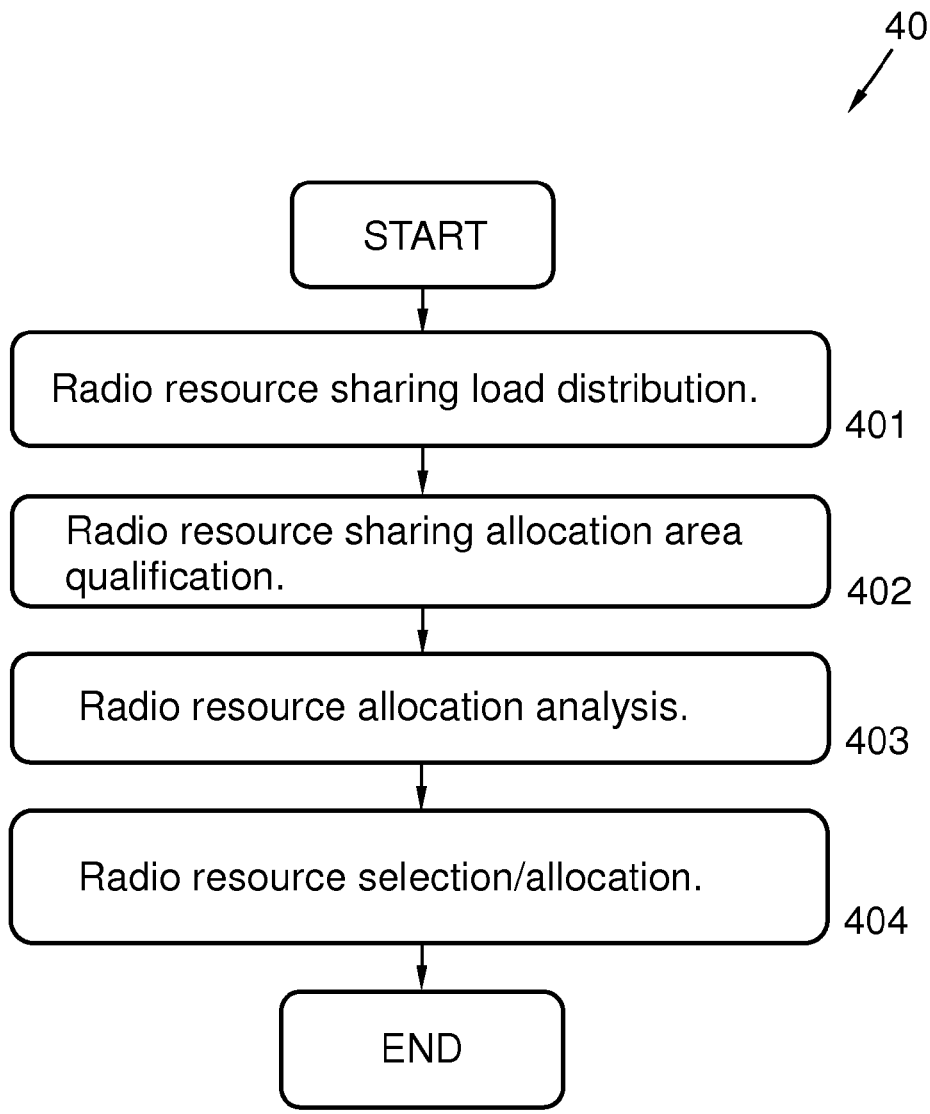
FIG. 4 is a schematic flow chart illustrating actions comprised in a method according to some embodiments.

FIG. 4 shows the general process flow 40 for radio resource allocation with LRE internal radio resource sharing option, according to some embodiments.

Radio resource allocation with LRE internal radio resource sharing option is a function that may determine best possible, or at least a somewhat improved radio resource allocation within the local radio environment 105, taking into account channel allocation status (with distribution between selecting original radio resource or shared radio resource as well as monitoring the level of sharing) and mobile location (with positioning relative surrounding radio coverage areas 115-1, 115-2, 115-3 as well as interference measurements conclusions). In general, this function may minimize the impact of internal radio resource sharing within the local radio environment 105 by either avoiding radio resource sharing or otherwise select a shared radio resource from possible candidate radio coverage areas 115-1, 115-2, 115-3 in an optimal, or at least somewhat improved way. This function may be an active part of the runtime radio resource allocation flow. The radio resource allocation with LRE internal radio resource sharing option may be performed in the network node 120.

To appropriately perform the radio resource allocation in the local radio environment 105, the method 40 may comprise a number of actions 401-404.

It is however to be noted that some of the described actions, e.g. action 401-404 may be performed in a somewhat different chronological order than the enumeration indicates. Also, it is to be noted that some of the actions may be performed within some alternative embodiments. Further any, some or all actions 401-404, such as for example e.g. 401, 402 and/or 403 may be performed simultaneously or in a rearranged chronological order. The method 40 for radio resource allocation with LRE internal radio resource sharing option may comprise the following actions:

Action 401

Radio resource sharing load distribution. This sub-function may secure a good balance between number of unique radio resource allocations and number of shared radio resource allocations within a radio coverage area 115-1, 115-2, 115-3. Note that when frequency domain resources are allocated on call basis in a radio coverage area, then there is no radio coverage area ownership of frequency domain resources, rather that the first radio coverage area 115-1 to make the allocation does the radio resource allocation of a unique radio resource and the second radio coverage area 115-2 may perform a shared radio resource allocation of the same radio resource. There may be different thresholds defined in this sub-function. At least one threshold regulates if a unique radio resource allocation or a shared radio resource allocation may be preferred as the next radio resource allocation, depending on current load situation.

Action 402

Radio resource sharing allocation area qualification. This action provides a protection against extra injected interference by introducing a guard zone at the nominal radio coverage area border within which radio resource sharing allocations may not occur. Mobile stations subject to a radio resource sharing allocation may not be located in this zone neither may a radio resource be shared for which the unique radio resource allocation mobile is located in this zone in its radio coverage area 115-1, 115-2, 115-3. The per radio coverage area inner border of the guard zone defines the radio resource sharing allocation area (shown in FIG. 5A and FIG. 5B) where radio resource sharing allocation may take place. This is a radio condition defined area based on fulfilment of serving radio cell signal quality criteria. The signal quality criteria, set per radio coverage area 115-1, 115-2, 115-3, may take into consideration e.g. different mobile receiver capabilities. The result of this sub-function may override advices from the radio resource sharing load distribution sub-function in action 401.

Action 403

Radio resource allocation analysis. This action takes advice from action 401 and action 402 above as input and analyses the current radio resource allocation status to provide a candidate list of possible radio resources for unique radio resource allocation and/or shared radio resource allocation. Within each category, this action may prefer to create a candidate list that avoids co-allocation within the local radio environment 105. When frequency domain resources are allocated on call basis in a radio coverage area, then there is no radio coverage area ownership of frequency domain resources and the provided candidate list may comprise radio resources not already allocated (subject to unique radio resource allocation) and/or radio resources already allocated (subject to shared radio resource allocation). This action may further implement a rule that restricts the radio resource allocation to only one radio resource sharing allocation per radio resource within the local radio environment 105, to limit extra interference injection.

Furthermore this action may perform a radio resource signal quality analysis to further rank the listed radio resource candidates. Typically existing Broadcast Control Channel (BCCH) signal quality measurement reports per mobile station are used for this analysis, both from the 'current' mobile station (subject to a new radio resource allocation) and already collected reports from other mobile stations within the local radio environment 105, but also alternative measurements may be considered e.g. to comprise uplink measurements. The analysis may take place in two further actions, 403-1 and 403-2:

Action 403-1 may take the measurement report originating from current mobile station into consideration to evaluate the radio resource candidates into ranked groups. If the radio resource candidate list comprises unique radio resource allocation candidates then the radio resource candidate list may not be further ranked and the whole list is considered one group. If the radio resource candidate list comprises radio resource sharing allocation candidates, then the radio resource candidate list may be ranked per frequency domain resource or radio coverage area reference according to the principle that a shared radio resource allocated by a neighbouring radio coverage area 115-1, 115-2, 115-3 with measured lower signal quality may be considered higher ranked than a shared radio resource allocated by a neighbouring radio coverage area 115-1, 115-2, 115-3 with measured higher signal quality. This first action of ranking may be a way to consider the best radio resource allocation, or at least an acceptable radio resource allocation from the current mobile station perspective.

Action 403-2 may take the measurement reports originating from other mobile stations outside the radio coverage area 115-1, 115-2, 115-3 but within the local radio environment 105 into consideration in order to refine the ranking within each group into frame time slot number resolution. This is possible as each mobile station now considered represents a given radio resource allocation in the neighbouring radio coverage area within the local radio environment 105. Ranking based on the current radio coverage area signal quality relation is a way of taking into account the experienced interference towards the other mobile station thus considering the best radio resource allocation, or at least an acceptable radio resource allocation, from the perspective of that mobile station. The same principle as in action 403-1 applies for the ranking according to measured signal quality relation.

Concerning actions 403-1 and/or 403-2, to avoid too high ranking of a radio resource with yet unreported measurement value, each measurement item may be initiated with a safe initial value in the decision database which is then subject to aging, i.e. gradually decreased until substituted by a real measurement value.

Action 404

Radio resource selection/assignment. This sub-function performs the final selection of a radio resource assignment candidate from the highest ranked group and between equal radio resources. For this purpose a generic rational selection method may be used such as lowest frame time slot number first.

For an existing mobile call a radio resource re-allocation may be supported due to various triggers such as poor channel quality, radio resource sharing load distribution status, radio resource sharing assignment de-qualification etc.

Figure 5A:
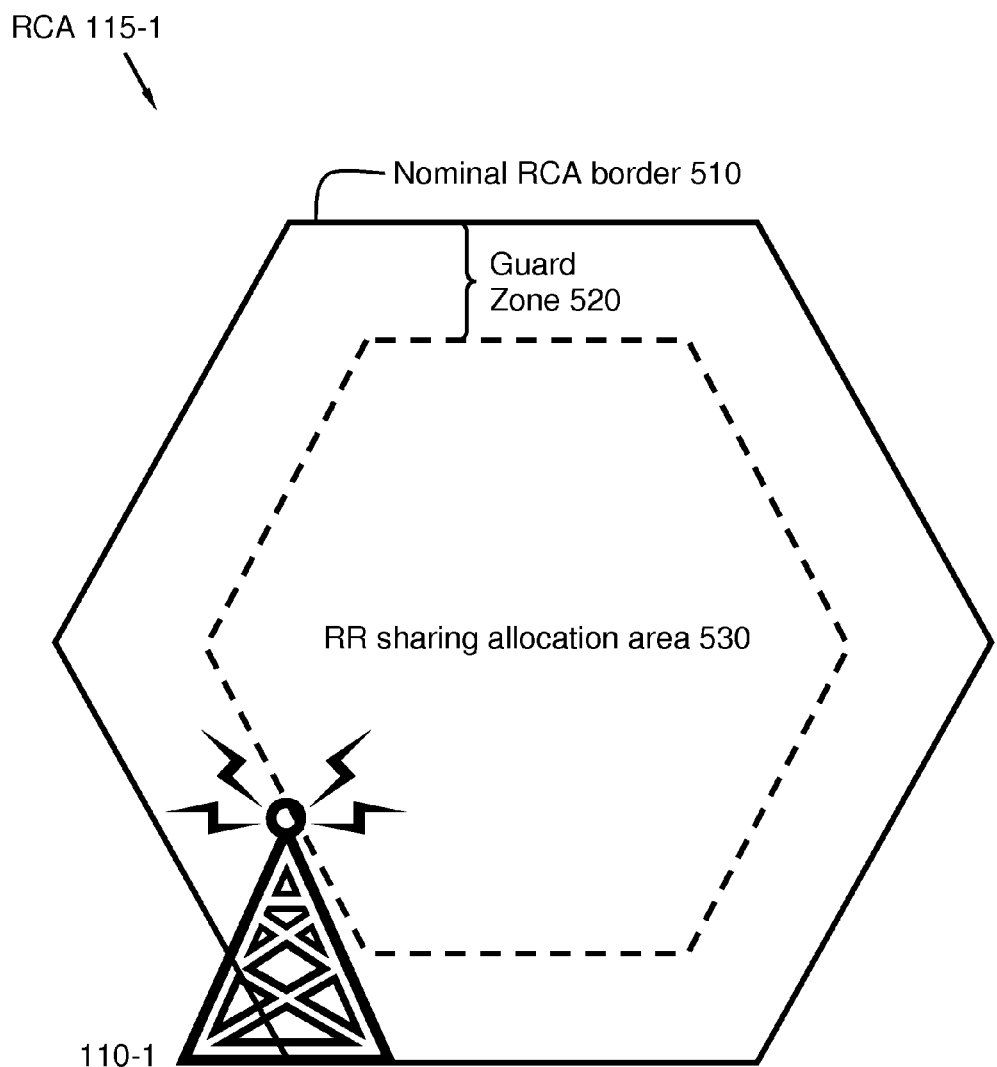
FIG. 5A is a schematic block diagram illustrating aspects according to some embodiments.

FIG. 5A illustrates radio resource sharing allocation area qualification, according to some embodiments.

The radio coverage area 115-1 has a nominal radio coverage area border 510. According to embodiments of the method, a guard zone 520 is introduced at the nominal radio coverage area border 510, within which radio resource sharing assignment may not occur. Thus radio resource sharing allocation may only be performed for mobile stations situated within the radio resource sharing allocation area 530, i.e. inside the nominal radio coverage area border 510, but not within the guard zone 520, according to some embodiments. The radio resource sharing allocation area 530 is thus a radio condition defined area based on fulfilment of serving radio coverage area signal quality criteria. The signal quality criteria, set per radio coverage area 115-1, 115-2, 115-3, may take into consideration e.g. different mobile receiver capabilities.

Figure 5B:
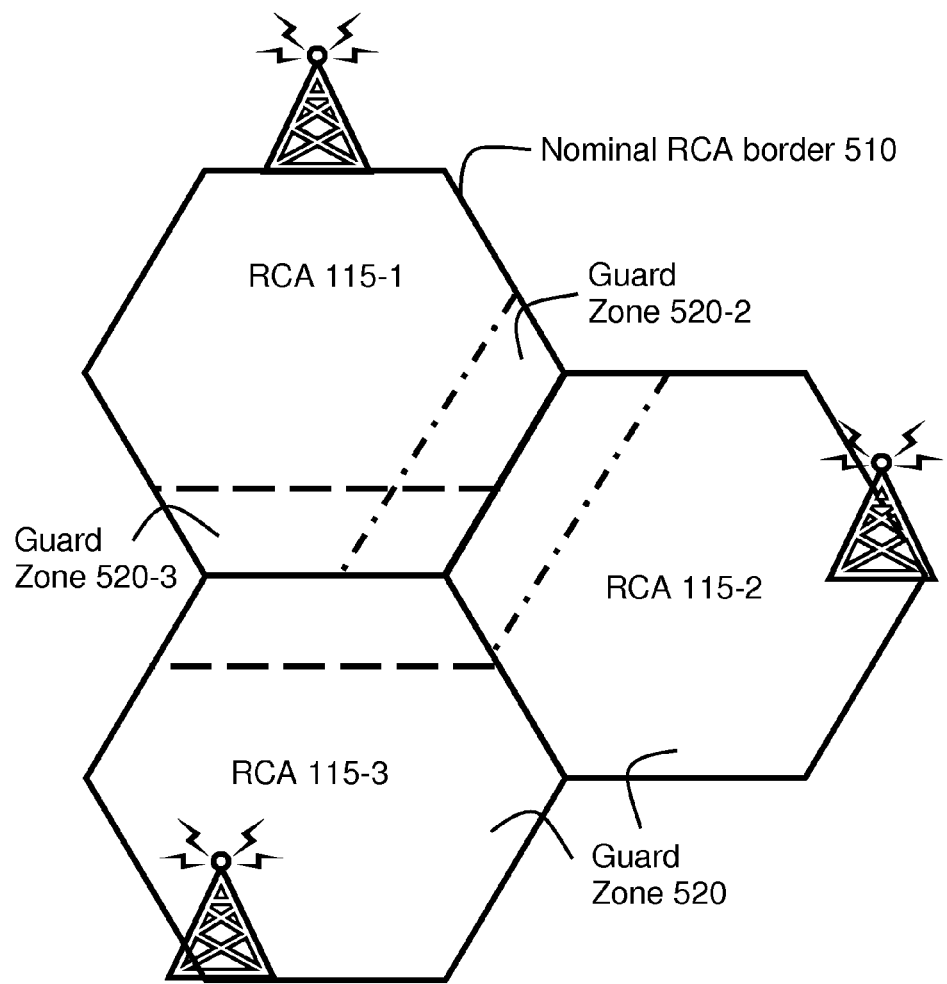
FIG. 5B is a schematic block diagram illustrating aspects according to some embodiments.

FIG. 5B illustrates radio resource sharing allocation area qualification, according to some alternative embodiments.

The radio coverage area 115-1 has a nominal radio coverage area border 510. According to embodiments of the method, a first guard zone 520-2 is introduced at the nominal radio coverage area border 510 within which radio resource sharing allocation may not occur with radio coverage area 115-2, and a second guard zone 520-3 is introduced at the nominal radio coverage area border 510 within which radio resource sharing allocation may not occur with radio coverage area 115-3. Thus radio resource sharing allocation may only be performed for mobile stations situated within the radio resource sharing allocation area, i.e. inside the nominal radio coverage area border 510, but not within the guard zone 520-2, for sharing radio resources with radio coverage area 115-2 and not within the guard zone 520-3, for sharing radio resources with radio coverage area 115-3, according to some embodiments. The radio resource sharing allocation area may thus be a radio condition defined area based on fulfilment of serving radio coverage area signal quality criteria. The signal quality criteria, set per radio coverage area 115-1, 115-2, 115-3, may take into consideration e.g. different mobile receiver capabilities.

Figure 6:
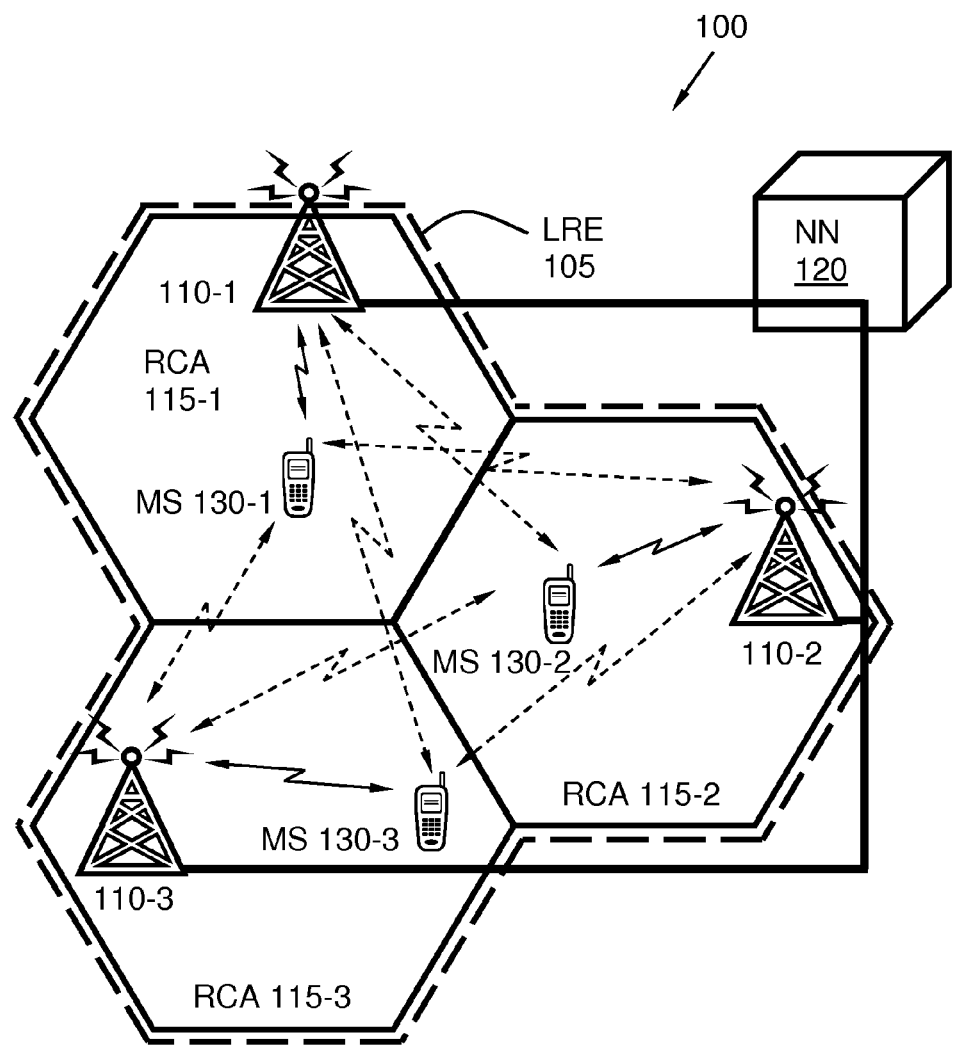
FIG. 6 is a schematic block diagram illustrating embodiments of a wireless communication system and a method therein.

FIG. 6 illustrates the signal quality relation measurements used. A first mobile station 130-1 is served by the first base station 110-1, in the first radio coverage area 115-1. As an example, it may report Broadcast Control Channel (BCCH) signal quality from the second base station 110-2 and the third base station 110-3 for the first step analysis. A second mobile station 130-2 and a third mobile station 130-3 may be located in other radio coverage areas 115-2, 115-3 within the local radio environment 105 and similarly report BCCH signal quality from the first base station 110-1 for the second step analysis. The method may comprise radio resource sharing within the local radio environment 105 in some embodiments. Thereby, a radio resource, which is dedicated for a first radio coverage area 115-1 may be utilised by a second radio coverage area 115-2, 115-3 within the same local radio environment 105, according to some embodiments.

Figure 7:
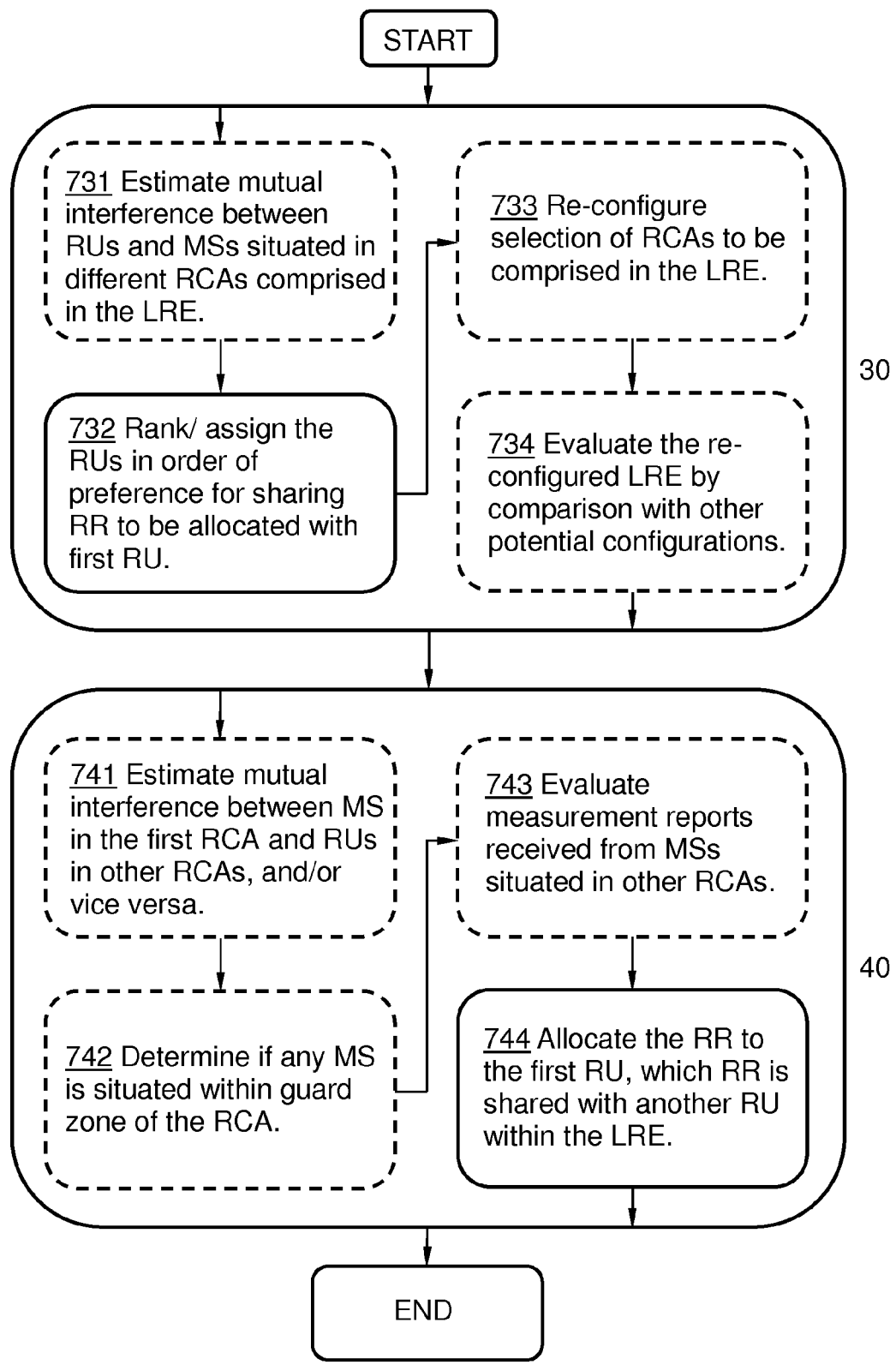
FIG. 7 is a schematic flow chart illustrating actions comprised in a method according to some embodiments.

FIG. 7 is a flow chart illustrating embodiments of a method in a network node 120 that may comprise a planning procedure 30 and an allocation procedure 40. The planning procedure 30 may comprise a number of actions 731-734. The allocation procedure 40 may comprise a number of actions 741-744. The method aims at allocating a shared radio resource to be used by a first radio unit 110-1. The first radio unit 110-1 is serving a first radio coverage area 115-1. Further, the radio resource is allocated to the first radio unit 110-1 when establishing a wireless communication with a mobile station 130-1 situated within the first radio coverage area 115-1. The first radio unit 110-1 is comprised in a local radio environment 105 comprising a plurality of radio units 110-1, 110-2, 110-3, each serving a respective radio coverage area 115-1, 115-2, 115-3. The radio units 110-1, 110-2, 110-3 may comprise e.g. a base station, a Node B or an eNode B, according to different embodiments. The network node 120 may be represented by a base station controller according to some embodiments. However, the network node 120 may alternatively be represented by a base transceiver station.

The radio resource to be allocated to the first radio unit 110-1 may in some embodiments be comprised in a pool of radio resources, which may be available for use within the local radio environment 105.

To appropriately allocate a shared radio resource to be used by the first radio unit 110-1 in the local radio environment 105, the method may comprise a number of actions 731-734 in a planning procedure 30 and a number of actions 741-744 in an allocation procedure 40. The planning procedure 30 is a preliminary allocation decision support, which is performed independently of the location of the mobile station 130-1 and of the radio resource to be shared. The allocation procedure 40 is performed when the mobile station 130-1 has been detected within the first radio coverage area 115-1, which is served by the first radio unit 110-1.

The planning procedure 30 may further, according to some alternative embodiments comprise assigning radio resources to each radio unit 110-1, 110-2, 110-3 within the local radio environment 105 to be used when establishing wireless communication with mobile stations 130-1, 130-2, 130-3 situated in the radio coverage areas 115-1, 115-2, 115-3 during the allocation procedure 40.

It is however to be noted that some of the described actions are optional and only comprised within some embodiments. Further, it is to be noted that the actions 731-734 in the planning procedure 30 and/or actions 741-744 in the allocation procedure 40, may be performed in a somewhat different chronological order and that some of them, e.g. action 731, actions 733-734 and/or actions 742-744 are optional and may be performed according to some alternative embodiments. In addition, any, some or all of the actions 731-734 and/or 741-744 may be performed simultaneously or in a somewhat rearranged chronological order. The method may comprise the following actions:

Action 731

This action is optional and may be performed within some alternative embodiments.

The mutual interference caused between the first radio unit 110-1 and mobile stations 130-2, 130-3 situated in any other radio coverage areas 115-2, 115-3 comprised in the local radio environment 105, and/or the mutual interference caused between the other radio units 110-2, 110-3 comprised in the local radio environment 105 and mobile station 130-1 situated in the first radio coverage area 115-1 served by the first radio unit 110-1 may be estimated.

The estimation of interference is based on statistical measurements made for a plurality of mobile stations 130-1, 130-2, 130-3 that may be situated in the radio coverage areas 115-1, 115-2, 115-3 comprised in the local radio environment 105, and/or geographical positions of the radio units 110-1, 110-2, 110-3, and/or knowledge about signal propagation constraints of any radio unit 110-1, 110-2, 110-3, such as beam forming and/or antenna direction, according to different embodiments.

Action 732

Other radio units 110-2, 110-3 comprised in the local radio environment 105 are ranked in order of preference for sharing the radio resource with the first radio unit 110-1 when establishing the wireless communication with the mobile station 130-1.

The radio units 110-2, 110-3 may be ranked in order of preference for sharing the radio resource to be allocated, according to the estimated 731 mutual interference caused, according to some embodiments.

Action 733

This action is optional and may be performed within some alternative embodiments.

The selection of radio coverage areas 115-1, 115-2, 115-3 to be comprised in the local radio environment 105 may according to some embodiments be re-configured, based on the number of released radio resources due to the amount of planned shared radio resources within the local radio environment 105, for increasing the number of radio coverage areas 115-1, 115-2, 115-3 comprised within the local radio environment 105.

Action 734

This action is optional and may be performed within some alternative embodiments, in which action 733 has been performed.

The re-configured 733 local radio environment 105 may be evaluated by comparison with other potential configurations of the local radio environment 105, for increasing the number of radio coverage areas 115-1, 115-2, 115-3 comprised within the local radio environment 105, according to some embodiments.

Action 741

This action is optional and may be performed within some alternative embodiments.

The mutual interference caused between the mobile station 130-1 situated within the first radio coverage area 115-1 and radio units 110-2, 110-3 situated in other radio coverage areas 115-2, 115-3 within the local radio environment 105, and/or the mutual interference caused between the first radio unit 110-1 and mobile stations 130-2, 130-3 situated in other radio coverage areas 115-2, 115-3 within the local radio environment 105, if they were to share the radio resource, may be estimated.

The estimation of the mutual interference caused between the mobile station 130-1 situated within the first radio coverage area 115-1 and radio units 110-2, 110-3 within the local radio environment 105, and/or the mutual interference caused between the first radio unit 110-1 and mobile stations 130-2, 130-3 situated in other radio coverage areas 115-2, 115-3 within the local radio environment 105, may be based on the locality of the mobile stations 130-1, 130-2, 130-3 within the respective radio coverage areas 115-1, 115-2, 115-3, and/or measurement reports received from mobile stations 130-1, 130-2, 130-3 and/or radio units 110-1, 110-2, 110-3 situated in the local radio environment 105.

The locality of the mobile stations 130-1, 130-2, 130-3 within the respective radio coverage areas 115-1, 115-2, 115-3 may be the geographical position of the mobile stations 130-1, 130-2, 130-3 in some embodiments.

Action 742

This action is optional and may be performed within some alternative embodiments.

The mobile station 130-1 may be determined to be situated within a guard zone 520 of the first radio coverage area 115-1 and/or that other mobile stations 130-2, 130-3 are situated within a guard zone 520 of the respectively radio coverage areas 115-2, 115-3, and if it is, disallowing allocation of any shared radio resource for communication between the first radio unit 110-1 and the mobile station 130-1, according to some embodiments.

Action 743

This action is optional and may be performed within some alternative embodiments.

Measurement reports received from mobile stations 130-1, 130-2, 130-3 and/or radio units 110-1, 110-2, 110-3 situated in radio coverage areas 115-1, 115-2, 115-3 within the local radio environment 105, may be evaluated according to some embodiments.

Action 744

The shared radio resource is allocated to the first radio unit 110-1 when establishing the wireless communication with the mobile station 130-1, which radio resource is shared with another radio unit 110-2, 110-3 within the local radio environment 105, based on the ranking 732 of radio units 110-2, 110-3.

Further, the radio resource may be allocated to the first radio unit 110-1 when establishing the wireless communication with the mobile station 130-1, based on the estimated 741 mutual interference caused, according to some embodiments.

In addition, according to some embodiments, the allocation of the shared radio resource may be further based on the receiver capability of the mobile station 130-1.

Furthermore, the allocation of the shared radio resource may be performed in some embodiments, also if a unique radio resource is available, in order to save some unique radio resource for future potential use for connections with any mobile station 130-1 that is disallowed to use the shared radio resource.

The allocation of the shared radio resource may further in some embodiments be based on the evaluation 743 of the received measurement reports.

Figure 8:
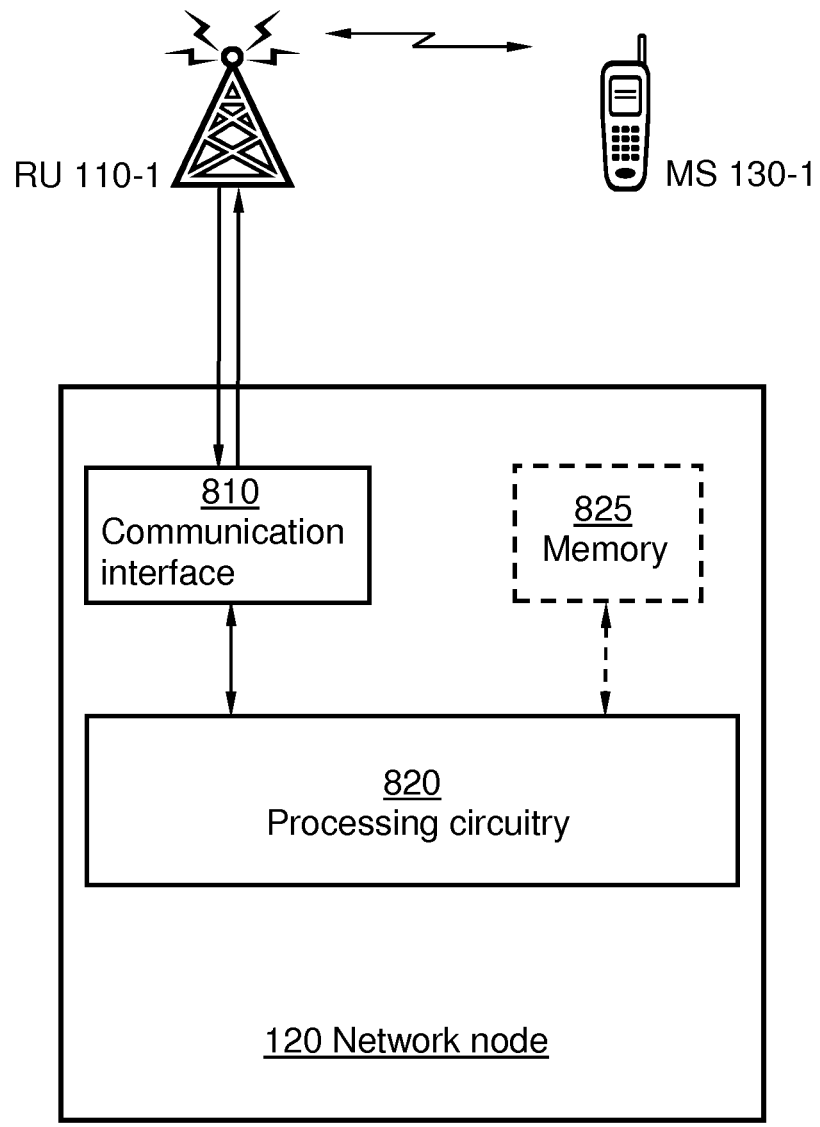
FIG. 8 is a schematic block diagram illustrating an embodiment of a network node.

FIG. 8 illustrates a network node 120, such as a base station controller, according to some embodiments, configured to perform any, some or all of the above described actions 731-734 and/or 741-744. The network node 120 may comprise e.g. a communication interface 810, a processing circuit 820 and a memory 825, according to some embodiments.

The network node 120 aims at allocating a shared radio resource to be used by a first radio unit 110-1 which is serving a first radio coverage area 115-1, when establishing a wireless communication with a mobile station 130-1. The mobile station 130-1 is situated within the first radio coverage area 115-1, in a local radio environment 105 comprising a plurality of radio units 110-1, 110-2, 110-3, each serving a respective radio coverage area 115-1, 115-2, 115-3.

The network node 120 may be represented by a base station controller according to some embodiments. However, the network node 120 may alternatively be represented by a base transceiver station.

The network node 120 comprises a processing circuitry 820. The processing circuitry 820 may be configured to perform a planning procedure 30, for ranking other radio units 110-2, 110-3, comprised in the local radio environment 105, in order of preference for sharing the radio resource with the first radio unit 110-1 when establishing the wireless communication with the mobile station 130-1. The planning procedure 30 is performed as a preliminary allocation decision support, independently of the location of the mobile station 130-1 and of the radio resource to be shared.

Further, the processing circuitry 820 is further configured to perform an allocation procedure 40, for allocating the shared radio resource to the first radio unit 110-1 when establishing the wireless communication with the mobile station 130-1. The radio resource is shared with another radio unit 110-2, 110-3 within the local radio environment 105, based on the ranking of radio units 110-2, 110-3. The allocation procedure is performed when the mobile station 130-1 has been detected within the first radio coverage area 115-1.

The processing circuitry 820 may further be configured, when performing the planning procedure, to estimate the mutual interference caused between the first radio unit 110-1 and mobile stations 130-2, 130-3 situated in any other radio coverage areas 115-2, 115-3 comprised in the local radio environment 105, and/or the mutual interference caused between the other radio units 110-2, 110-3 comprised in the local radio environment 105 and mobile stations 130-1 situated in the first radio coverage area 115-1.

Further, embodiments of the processing circuitry 820 may be further configured to rank the radio units 110-2, 110-3 in order of preference for sharing the radio resource to be allocated, according to the estimated mutual interference caused.

In addition, the processing circuitry 820 may furthermore be configured to estimate the interference based on statistical measurements made for a plurality of mobile stations 130-1, 130-2, 130-3 situated in the radio coverage areas 115-1, 115-2, 115-3 comprised in the local radio environment 105, and/or geographical positions of the radio units 110-1, 110-2, 110-3, and/or knowledge about signal propagation constraints of any radio unit 110-1, 110-2, 110-3, such as beam forming and/or antenna direction, according to different embodiments.

In addition, according to some embodiments, the processing circuitry 820 may also be further configured to estimate the mutual interference caused between the mobile station 130-1 situated within the first radio coverage area 115-1 and radio units 110-2, 110-3 situated in other radio coverage areas 115-2, 115-3 within the local radio environment 105, and/or the mutual interference caused between the first radio unit 110-1 and mobile stations 130-2, 130-3 situated in other radio coverage areas 115-2, 115-3 within the local radio environment 105, if they were to share the radio resource.

Also, in some embodiments, the processing circuitry 820 may further be configured to allocate the radio resource to the first radio unit 110-1 when establishing the wireless communication with the mobile station 130-1, further based on the estimated mutual interference caused.

The processing circuitry 820 may further be configured to determine if the mobile station 130-1 is situated within a guard zone 520 of the first radio coverage area 115-1 and/or if other mobile stations 130-2, 130-3 are situated within a guard zone 520 of the respective other radio coverage areas 115-2, 115-3. Also, the processing circuitry 820 may further be configured to disallow allocation of any shared radio resource for communication between the first radio unit 110-1 and the mobile station 130-1.

The processing circuitry 820 may further be configured to allocate the shared radio resource based on the receiver capability of the mobile station 130-1.

Further, the processing circuitry 820 may also be configured, in addition, to allocate the shared radio resource to the first radio unit 110-1, also if a unique radio resource is available, in order to save some unique radio resource for future potential use for connections with any mobile station 130-1 that is disallowed to use the shared radio resource.

The processing circuitry 820 may further be configured, when performing the allocation procedure, to evaluate measurement reports received from mobile stations 130-1, 130-2, 130-3 and/or radio units 110-1, 110-2, 110-3 situated in radio coverage areas 115-1, 115-2, 115-3 within the local radio environment 105. Also, in addition, the processing circuitry 820 may be configured to allocate the shared radio resource based on the evaluation of the received measurement reports.

The processing circuitry 820 may in some embodiments be further configured to estimate the mutual interference caused between the mobile station 130-1 situated within the first radio coverage area 115-1 and radio units 110-2, 110-3 within the local radio environment 105, and/or the mutual interference caused between the first radio unit 110-1 and mobile stations 130-2, 130-3 situated in other radio coverage areas 115-2, 115-3 within the local radio environment 105, based on the locality of the mobile stations 130-1, 130-2, 130-3 within the respectively radio coverage areas 115-1, 115-2, 115-3, and/or measurement reports received from mobile stations 130-1, 130-2, 130-3 and/or radio units 110-1, 110-2, 110-3 situated in the local radio environment 105.

The processing circuitry 820 may further be configured, when performing the planning procedure, to re-configure the selection of radio coverage areas 115-1, 115-2, 115-3 to be comprised in the local radio environment 105, according to some embodiments. The re-configuration may be based on the number of released radio resources due to the amount of planned shared radio resources within the local radio environment 105. The re-configuration of the selection of radio coverage areas 115-1, 115-2, 115-3 to be comprised in the local radio environment 105 may be made for increasing the number of radio coverage areas 115-1, 115-2, 115-3 comprised within the local radio environment 105, according to some embodiments.

The processing circuitry 820 may in addition be further configured, when performing the planning procedure, to evaluate the re-configured local radio environment 105 by comparison with other potential configurations of the local radio environment 105, for increasing the number of radio coverage areas 115-1, 115-2, 115-3 comprised within the local radio environment 105.

The processing circuitry 820 may also furthermore be configured, when performing the planning procedure, to assign radio resources to each radio unit 110-1, 110-2, 110-3 within the local radio environment 105 to be used when establishing wireless communication with mobile stations 130-1, 130-2, 130-3 situated in the radio coverage areas 115-1, 115-2, 115-3 during the allocation procedure.

The processing circuitry 820 may further be configured in some embodiments to have the radio resource to be allocated to the first radio unit 110-1 comprised in a pool of radio resources, which are available for use within the local radio environment 105.

The processing circuitry 820 may be represented by one or more instances of e.g. a Central Processing Unit (CPU), a microprocessor, an Application Specific Integrated Circuit (ASIC) or other processing logic that may interpret and execute instructions. The processing circuitry 820 may perform all data processing functions for inputting, outputting, and processing of data including data buffering and device control functions, such as call processing control, user interface control, or the like.

According to some embodiments, the network node 120 also may comprise a communication interface 810. The communication interface 810 may be configured for transmitting and/or receiving wired and/or wireless signals to/from a radio unit 110-1.

Also, the network node 120 may comprise at least one memory 825, according to some embodiments. The optional memory 825 may comprise a physical device utilized to store data or programs i.e. sequences of instructions, on a temporary or permanent basis. According to some embodiments, the memory 825 may comprise integrated circuits comprising silicon-based transistors. Further, the memory 825 may be volatile or non-volatile. The network node 120 may further according to some embodiments comprise at least one volatile memory 825 and also at least one non-volatile memory 825.

It is to be noted that any internal electronics of the network node 120, not completely necessary for understanding the present method according to the actions 731-734 and 741-744 have been omitted from FIG. 8, for clarity reasons.

Further, it is to be noted that some of the described units 810-825 comprised within the network node 120 are to be regarded as separate logical entities but not with necessity separate physical entities.

The actions 731-734 and 741-744 in the network node 120 may be implemented through one or more processing circuitry 820 in the network node 120, together with computer program code for performing the functions of the present actions 731-734 and 741-744. Thus a computer program product, comprising instructions for performing the actions 731-734 and 741-744 in the network node 120 may allocate a shared radio resource to be used by a first radio unit 110-1, serving a first radio coverage area 115-1 when establishing a wireless communication with a mobile station 130-1 situated within the first radio coverage area 115-1, in a local radio environment 105 comprising a plurality of radio units 110-1, 110-2, 110-3, each serving a respective radio coverage area 115-1, 115-2, 115-3, when the computer program product is loaded into the processing circuitry 820.

The computer program product mentioned above may be provided for instance in the form of a data carrier carrying computer program code for performing the actions 731-734 and 741-744 when being loaded into the processing circuitry 820. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code can furthermore be provided as program code on a server and downloaded to the network node 120 remotely, e.g. over an Internet or an intranet connection.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it may be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The terminology used in the detailed description of the particular embodiments illustrated in the accompanying drawings are not intended to be limiting of the network node 120 and the method described herein.

The invention claimed is:

1. A method in a network node for sharing radio resources among a plurality of radio units included in a local radio environment, each radio unit serving a respective radio coverage area and said method comprising:
   performing a planning procedure that includes, for a first one of the radio units having a respective first one of the radio coverage areas, determining a ranking of the other radio units representing preferences for sharing radio resources with the other radio units; and
   performing an allocation procedure in response to detection of a mobile station in the first radio coverage area, said allocation procedure including determining, based on said ranking of the other radio units, a shared radio resource to be allocated at the first radio unit for establishing a wireless communication with the mobile station, and wherein the shared radio resource is shared with one of the other radio units in the local radio environment.

2. The method according to claim 1, wherein determining the ranking of the other radio units includes:
   estimating at least one of the mutual interference caused between the first radio unit and mobile stations situated in any of the other radio coverage areas in the local radio environment, and the mutual interference caused between the other radio units in the local radio environment and mobile stations situated in the first radio coverage area; and
   ranking the other radio units according to the estimated mutual interference caused.

3. The method according to claim 2, wherein the estimation of mutual interference is based on at least one of: statistical measurements made for a plurality of mobile stations situated in the radio coverage areas in the local radio environment; geographical positions of the radio units; and knowledge of signal propagation constraints of any of the radio units.

4. The method according to claim 1, wherein the allocation procedure comprises:
   estimating at least one of: the mutual interference caused between the mobile station situated in the first radio coverage area and one or more of the other radio units; and the mutual interference caused between the first radio unit and other mobile stations situated in one or more of the other radio coverage areas, if such other mobile stations were to share the same shared radio resource as the one being allocated at the first radio unit; and
   determining the shared radio resource to be allocated further based on the estimated mutual interference caused.

5. The method according to claim 1, further comprising:
   determining whether a guard zone condition is met by determining at least one of:
      whether the mobile station is situated within a guard zone of the first radio coverage area; and whether other mobile stations are situated within a guard zone of the respective radio coverage areas; and
   when the guard condition is met, disallowing the allocation of any shared radio resource for communication between the first radio unit and the mobile station.

6. The method according to claim 1, wherein the allocation of the shared radio resource is further based on considering the receiver capability of the mobile station.

7. The method according to claim 1, wherein the allocation procedure includes allocating a shared radio resource even when a unique radio resource is available, in order to save the unique radio resource for future potential use for connections with any mobile station that is disallowed to use the shared radio resource.

8. The method according to claim 1, wherein the allocation procedure is further based on evaluating measurement reports received from mobile stations or radio units situated in radio coverage areas within the local radio environment.

9. The method according to claim 1, wherein in determining the shared radio resource to be allocated, the allocation procedure includes:
   estimating at least one of: the mutual interference caused between the mobile station situated within the first radio coverage area and one or more of the other radio units; and the mutual interference caused between the first radio unit and other mobile stations situated in one or more other ones of the radio coverage areas within the local radio environment; and
   wherein said estimating is based on at least one of: the locality of the mobile stations within the respective radio coverage areas; and measurement reports received from mobile stations or radio units situated in the local radio environment.

10. The method according to claim 1, wherein the planning procedure includes re-configuring the selection of radio coverage areas to be included in the local radio environment, based on the number of released radio resources due to the amount of planned shared radio resources within the local radio environment, for increasing the number of radio coverage areas that are included in the local radio environment.

11. The method according to claim 10, wherein the planning procedure further comprises evaluating the re-configured local radio environment by comparison with other potential configurations of the local radio environment, for increasing the number of radio coverage areas included in the local radio environment.

12. The method according to claim 1, wherein the planning procedure further comprises assigning radio resources to each radio unit within the local radio environment to be used when establishing wireless communication with mobile stations situated in the radio coverage areas during the allocation procedure.

13. The method according to claim 1, further comprising allocating the shared radio resource to the first radio unit from a pool of radio resources that are available for use within the local radio environment.

14. A network node for sharing radio resources among a plurality of radio units included in a local radio environment, each radio unit serving a respective radio coverage area and said network node comprising processing circuitry configured to:
   perform a planning procedure that includes, for a first one of the radio units having a respective first one of the radio coverage areas, determining a ranking of the other radio units representing preferences for sharing radio resources with the other radio units; and
   perform an allocation procedure in response to detection of a mobile station in the first radio coverage area, said allocation procedure including determining, based on said ranking of the other radio units, a shared radio resource to be allocated at the first radio unit for establishing a wireless communication with the mobile station, and wherein the shared radio resource is shared with one of the other radio units in the local radio environment.

15. The network node according to claim 14, wherein the processing circuitry is configured to rank the radio units in order of preference based on estimates of the mutual interference caused between the first radio unit and mobile stations situated in one or more of the other radio coverage areas in the local radio environment or the mutual interference caused between the other radio units in the local radio environment and mobile stations situated in the first radio coverage area.

16. The network node according to claim 15, wherein the processing circuitry is further configured to estimate the mutual interference based on at least one of:
   statistical measurements made for a plurality of mobile stations situated in the radio coverage areas included in the local radio environment; geographical positions of the radio units; and
   knowledge about signal propagation constraints of any of the radio units.

17. The network node according to claim 14, wherein as part of determining the shared radio resource to be allocated, the processing circuitry is further configured to estimate at least one of: the mutual interference caused between the mobile station situated within the first radio coverage area and one or more of the other radio; and the mutual interference caused between the first radio unit and mobile stations situated in one or more of the other radio coverage areas, if such other mobile stations were to share the same shared radio resource as the one being allocated at the first radio unit.

18. The network node according to claim 14, wherein the processing circuitry is further configured to determine whether a guard zone condition is met by determining whether the mobile station is situated within a guard zone of the first radio coverage area or whether other mobile stations are situated within a guard zone of the respective radio coverage areas, and, if the guard zone condition is met, to disallow allocation of any shared radio resource for communication between the first radio unit and the mobile station.

19. The network node according to claim 14, wherein the processing circuitry is further configured to allocate the shared radio resource based on the receiver capability of the mobile station.

20. The network node according to claim 14, wherein the processing circuitry is further configured to allocate the shared radio resource to the first radio unit even when a unique radio resource is available, in order to save the unique radio resource for future potential use for connections with any mobile station that is disallowed to use the shared radio resource.

21. The network node according to claim 14, wherein the processing circuitry is further configured determine the shared radio resource to be allocated based on evaluating measurement reports received from mobile stations in one or more of the radio coverage areas or one or more of the other radio units.

22. The network node according to claim 21, wherein the processing circuitry is further configured to:
   consider mutual interference when determining the shared radio resource to be allocated;
   estimate the mutual interference as at least one of: the mutual interference caused between the mobile station situated within the first radio coverage area and radio units within the local radio environment; and the mutual interference caused between the first radio unit and mobile stations situated in other radio coverage areas within the local radio environment; and
   base the estimation of the mutual interference on at least one of: the locality of the mobile stations within the respective radio coverage areas; and measurement reports received from mobile stations or radio units situated in the local radio environment.

23. The network node according to claim 14, wherein the processing circuitry is further configured, as part of said planning procedure, to re-configure the selection of radio coverage areas to be included in the local radio environment, based on the number of released radio resources due to the amount of planned shared radio resources within the local radio environment, for increasing the number of radio coverage areas comprised within the local radio environment.

24. The network node according to claim 23, wherein the processing circuitry is further configured, as part of said planning procedure, to evaluate the re-configured local radio environment by comparison with other potential configurations of the local radio environment, for increasing the number of radio coverage areas included within the local radio environment.

25. The network node according to claim 14, wherein the processing circuitry is further configured, as part of said planning procedure, to assign radio resources to each radio unit within the local radio environment to be used when establishing wireless communication with mobile stations situated in the radio coverage areas during the allocation procedure.

26. The network node according to claim 14, wherein the processing circuitry is further configured to allocate the shared radio resource to be allocated to the first radio unit from a pool of radio resources that are available for use within the local radio environment.

27. The network node according to claim 14, wherein the network node comprises a base station controller.

28. The network node according to claim 14, wherein the network node comprises a base transceiver station.

\* \* \* \* \*